Jan. 10, 1967  J. A. ZANG  3,296,982
CONTINUOUS MIXING AND DEVELOPING MACHINE
Filed June 16, 1964  3 Sheets-Sheet 1

INVENTOR
JOSEPH A. ZANG
BY *Bradley Cohn*
ATTORNEY

Jan. 10, 1967   J. A. ZANG   3,296,982
CONTINUOUS MIXING AND DEVELOPING MACHINE
Filed June 16, 1964   3 Sheets-Sheet 2

INVENTOR
JOSEPH A. ZANG
BY
ATTORNEY

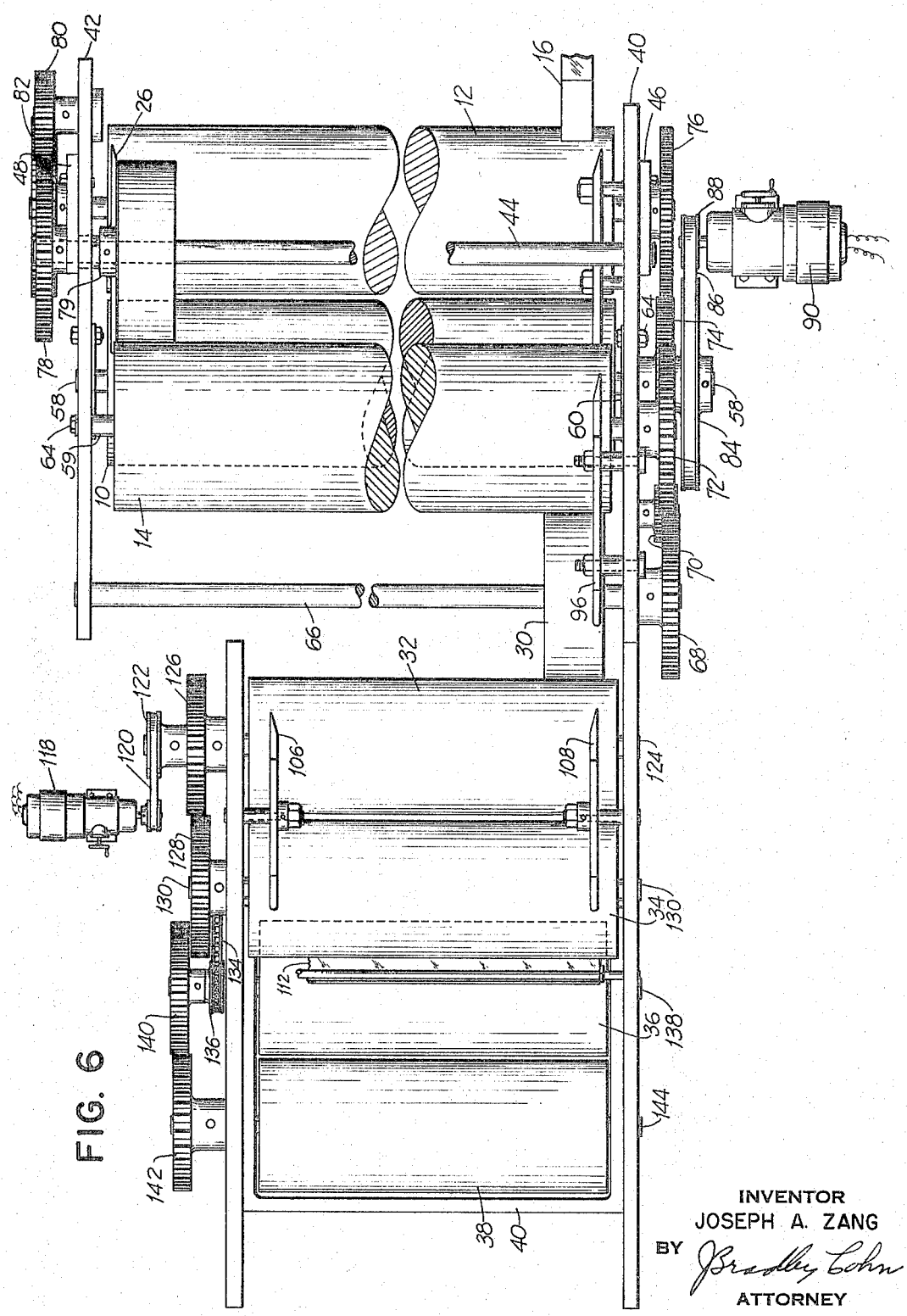

United States Patent Office 3,296,982
Patented Jan. 10, 1967

3,296,982
CONTINUOUS MIXING AND DEVELOPING MACHINE
Joseph A. Zang, Rockville Centre, N.Y., assignor to American Machine & Foundry Company, a corporation of New Jersey
Filed June 16, 1964, Ser. No. 375,526
7 Claims. (Cl. 107—30)

This invention relates to apparatus for treating and processing highly viscous substances, such as paste, doughs, plastics and thixotropes whose physical and/or chemical properties may be varied by intensive work input. More particularly, it relates to the development of doughs and batters.

It is an object of the invention to provide a new and useful apparatus for conditioning or kneading alimentary pastes, batters and systems of similar rheology.

It is an object of the invention to provide a unique system for the rapid development of dough wherein the mixed ingredients are continuously fed, transported and developed in an "open" system.

It is an object of the invention to provide a sanitary system for developing dough wherein all of the process equipment parts are readily accessible for cleaning.

Another object of the invention is to provide a system which is readily accessible for cleaning without dismantling its impeller shtafts or their bearings.

It is an object of the invention to provide a continuous system wherein dough is repeatedly rolled within the nip of cooperating rollers to feed and "develop" the dough.

Another object of the invention is to provide an open system for rapid work input at atmospheric pressure.

Another object of the invention is to provide in a continuous system a flow unaffected by pressure surges and accordingly readily adaptable to a continuous cut-off or divider mechanism which may be operated without reference to cyclical surges.

Still another object of the invention is to provide an arrangement of two or more rollers for progressively and repeatedly passing dough through compression and stretching stages to develop the dough.

An object of the invention is to develop dough by continuously passing the mixture of ingredients or not fully developed dough around a roller and between the roller and a closely adjacent surface or surfaces.

Still another object of the invention is to arrange a nest of rollers in which the dough moves helically back and forth along selected rollers of the nest in a tortuous path while passing repeatedly beneath the nips of rollers in the nest.

A further object of the invention is to provide a means for continuously kneading, stretching and compressing dough as it moves in a continuous ribbon a determinable distance.

It is an object of the invention to provide a dough developer that does not require a containing vessel.

Referring to the drawings:

FIG. 6 is a plan view of the mechanism illustrated in FIG. 3.

Figure 1:
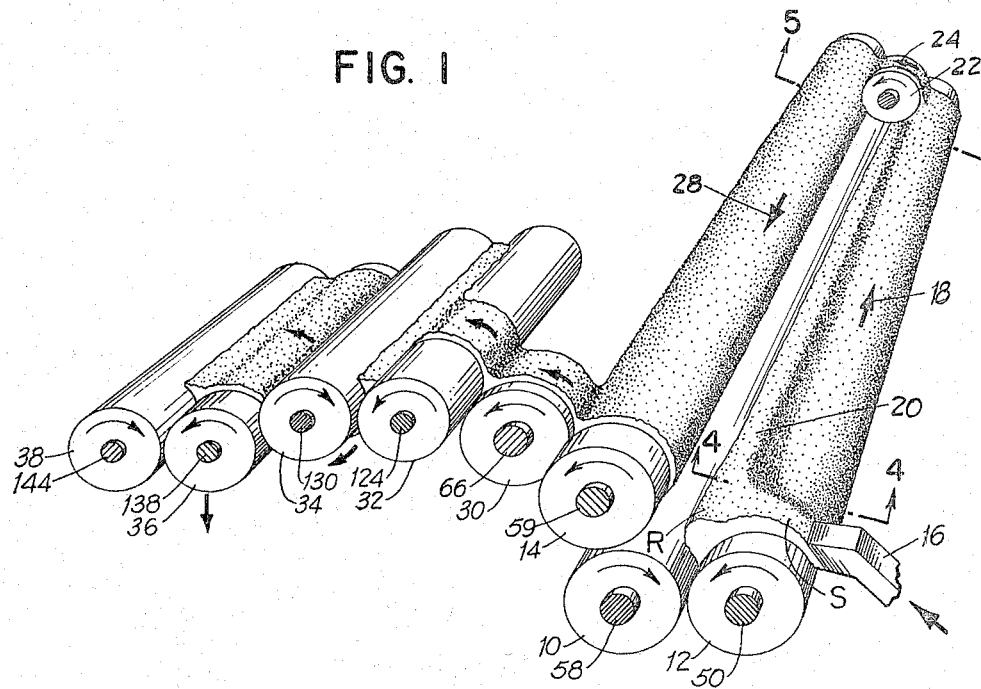
FIG. 1 is a perspective view of a developer, spreader and delivery device in accordance with my invention illustrating the path of the dough.

Referring to FIG. 1, the rollers 12 and 14 rotate in the same direction as indicated by the arrows. Roller 10 rotates in the opposite direction and is spaced from each roller 12 and 14 by an adjustable nip distance. A mixture of the formula ingredients in dough is introduced by a nozzle 16 onto the left end of the front roller 12. The dough travels about the roller 12 and through the nip formed with the roller 10. A guide plate 17 (FIG. 3) prevents the dough from moving to the left side and it therefore migrates in the direction indicated by the arrow 18 along the roller 12 while passing repeatedly about the roller. A reservoir 20 of dough forms at and above the nip of the rollers 10 and 12. Since the dough is flowing in the direction of the arrow 18 and is simultaneously being rotated with the roller 12, the actual path of a given particle of dough is a helix having the rotary direction of the roller 12 and progressing in the direction of arrow 18.

The roller 22 is mounted to co-rotate with roller 12 at very close surface to surface proximity. Roller 22 and a guide 26 are adjustable along shaft 44 to shorten or lengthen the operating portions of rollers 12 and 14. This causes the dough to move over the roller 22 as indicated by the arrow 24 and onto the roller 14. Roller 14 is a co-rotational with roller 12 and like roller 12 is in counter-rotating nip relationship with the counter-rotating roller 10.

A guard or guide 26 restrains the dough from moving to the right side (as viewed in FIG. 2) of both of the rollers 12 and 14. Consequently the dough returns in the direction of the arrow 28 along the roller 14 toward the front side of the machine as viewed in FIG. 1.

A short transfer roller 30 co-rotating with the roller 14 and in close surface to surface relation therewith moves the dough from the left end of the roller 14 to the counter-rotating spreader rollers 32 and 34. The roller 32 co-rotates with the roller 30 to draw dough therefrom. The clearance between rollers 32 and 34 is larger than the clearance rollers 10 and 14 so that the dough may spread and be delivered in and beneath the roller 34 as a thicker and wider stream. Thereafter it is conveyed upwardly between roller 34 to 36 when the stream may be widened for delivery into the counter-rotating feed rollers 36 and 38. Widening of the stream is achieved by a closer clearance between rollers 34 and 36 than between rollers 34 and 32. Feed rollers 36 and 38 deliver to the dividing box 40 which may be of the type shown in the co-pending application of Potter, Kelly and Zang, S.N. 270,248 filed April 3, 1963. Rollers 32, 34, 35 and 38 have a slower surface speed than the developing rollers 10, 12 and 14 and transfer rollers 22 and 30. This widening of the stream facilitate dividing of the individual dough pieces by forming the stream to the dimension of the dividing box.

In the above description the dough ingredients have been referred to as dough for simplicity. The fact is the dough ingredients are developed into a dough progressively as they move along rollers 12 and 14. I have found that the continuous circulation of dough ingredients through the nip of a pair of rollers as above described produces a work input into the dough sufficient to develop it. While I do not fully understood the phenomena, it would appear that the rollers as they draw from the reservoir 20 produce a compressing and stretching effect of a motion to produce a uniform fine grained dough. I have found further that conventional white breads made with high quality hard wheat flour produce a very fine and uniform grained break of 2400 cc. per pound at a work input of 0.5 horse power minutes per pound of developed dough.

Figure 3:
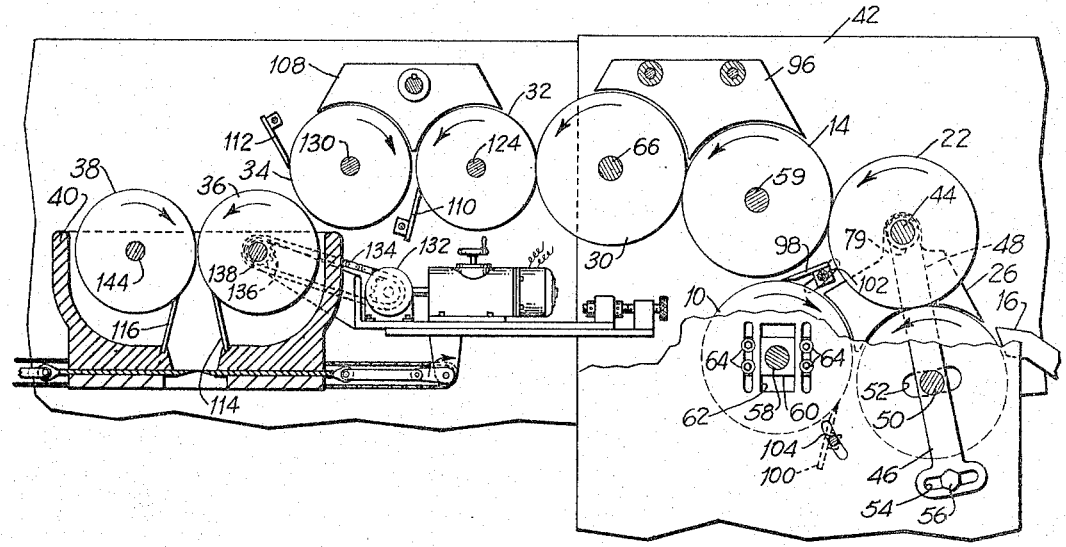
FIG. 3 is a side elevation partially in section of a mechanism utilizing the rollers illustrated in FIG. 1.
Figure 4:
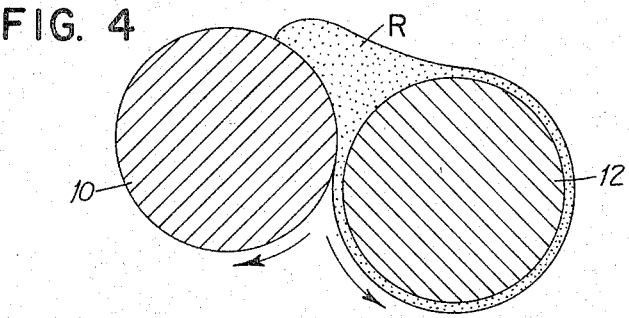
FIG. 4 is a sectional view taken on the line 4—4 of FIG. 1.

Referring to FIGS. 3 and 6, the shaft 44 is non-rotatably mounted in the main frames 40 and 42 and has rotatably mounted on it a sleeve 79 to which is secured the short roller 22. Shaft 44 pivotally supports a pair of arms 46, 48 which rotatably carry the shaft 50 of roller 12. Shaft 50 passes through a slot 52 in each of the main frames 40, 42. The free end of the arms 46, 48 have a slot 54 engaged by lock bolt 56. This arrangement permits adjustment of the gap between the rollers 12 and 10 without varying the surface to surface distance between the rollers 12 and 22.

The shaft 58 of roller 10 is supported in bearing blocks 60 which are mounted for vertical adjustment in suitable slots 62. A plurality of lock nuts 64 screwed into flanges of the block 60 engage other slots in the main frames 40 and 42 to hold the roller 10 in a desired position with respect to its distance from the roller 14. It will thus be seen that the rollers 12, 22 and 14 remain in very close relation to contact each other while the roller 10 may be adjusted relative to roller 14 and in turn the roller 12 adjusted with respect to the roller 10.

The shaft 66 is also rotatably journaled in the frames 40 and 42 and has mounted on it a short transfer roller 30.

The several rollers are driven by a variable speed motor 90 whose pulley 88 is connected by a belt 86 to pulley 84 secured on shaft 58. Gear 74 is also secured on shaft 58 and meshes with gear 72 on shaft 59 of pulley 14. Gear 72 meshes with an idler gear 70 enmeshed with the gear 68 secured on shaft 66. Thus, the rollers 14 and 30 co-rotate with each other in counter-rotation to the roller 10.

The gear 74 is also enmeshed with the gear 76 secured on shaft 50 to whose other end is secured a gear 82 which enmeshes with an idler gear 80 enmeshed with gear 78 secured on sleeve 79 carrying roller 22 and rotating on stationary shaft 44. Thus, rollers 12 and 22 co-rotate with each other and counter-rotate with roller 10.

Figure 5:
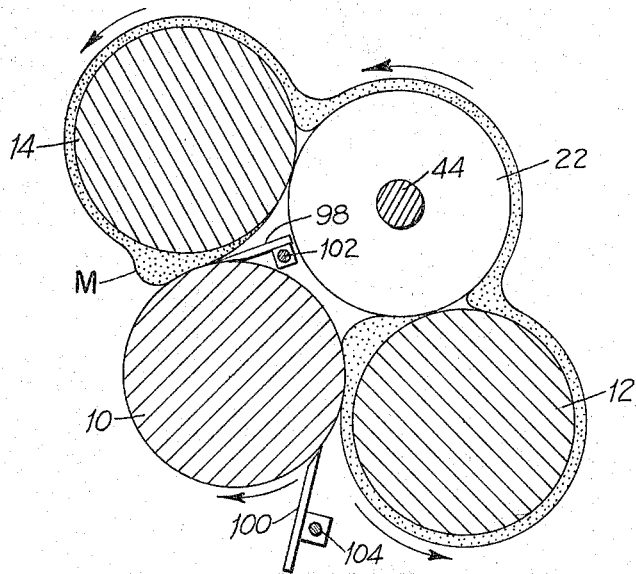
FIG. 5 is a sectional view taken on the line 5—5 of FIG. 1.

The dough guide 92 is mounted on shaft 44 and spaced from the frame 42 so that its arcuate portions are in close adjacency to the approaching surfaces of rollers 10 and 12 to confine the dough moving along these rollers. The guide 94 is spaced in a similar position at the other end of the roller 12 and is secured to shaft 44 and spaced from the roller 40. A further guide 96 occupies a similar relationship with respect to the roller 14 and transfer roller 30. A pair of doctor blades 98 and 100 are adjustably mounted on shafts 102 and 104, respectively. Shafts 102 and 104 are adjustably secured in suitable slots formed in the main frames 40 and 42. Doctor blades 98 and 100 engage the roller 10 at a position just beyond the nips of that roller with the rollers 14 and 12, respectively. This arrangement of the doctor blade as is clearly illustrated in FIG. 5 assures passage of the dough or mix M repetitively about the rollers 12 and 14. As the dough reaches the front end of roller 14, it is transferred by roller 30 to roller 32 which is one of a pair of counter-rotating rollers 32 and 34. Guards 106 and 108 limit the lengthwise travel of the dough on the spreading rollers 32, 34. The distance of the nip of these rollers is greater than the distance between the rollers 14 and 10 and since circumferential speed of these rollers is less, a slower moving thicker stream of dough passes between the nip.

Referring to FIG. 3, a doctor blade 110 engages the roller 32 just beneath its nip with roller 34 so that, as indicated in FIG. 1, the dough passes around the bottom of roller 34 and onto the top of roller 36 of a counter rotating pair of pump rollers 36, 38. The doctor blade 112 assures passage of dough from roller 34 to roller 36. FIG. 3 illustrates the dividing box 40 having the cut-off knives 114, 116 corresponding to cut-off knives 94, 96 of the aforementioned Potter et al. application, S.N. 270,248.

The counter-rotating spreading rollers 32, 34 are driven by means of a variable speed motor 118 drivingly connected by a belt 120 to a pulley 122 mounted on the shaft 124 of roller 32. Also mounted on the shaft 124 is a gear 126 enmeshed with the gear 128 secured on the shaft 130 of roller 34.

A variable speed motor 132 is connected by a chain 134 to a sprocket 136 on shaft 138 of roller 36. Shaft 138 further carries the gear 140 which is enmeshed with the gear 142 secured in shaft 144 of roller 38. Further details of the divider mechanism is not deemed necessary since it is set forth in the aforementioned application of Potter et al., S.N. 270,248.

OPERATION

A dough slurry S is continuously fed from the nozzle 16 onto the roller 12. Since the doctor blade 100 prevents it from passing around the roller 10, the slurry moves forwardly along the roller 12 in the direction indicated by the arrow 18 while simultaneously being passed and repassed into the reservoir R and through the nips of the rollers 10 and 12. Transfer roller 22 and guide 26 move it to the roller 14 where it returns in the direction of the arrow 28.

Figure 2:
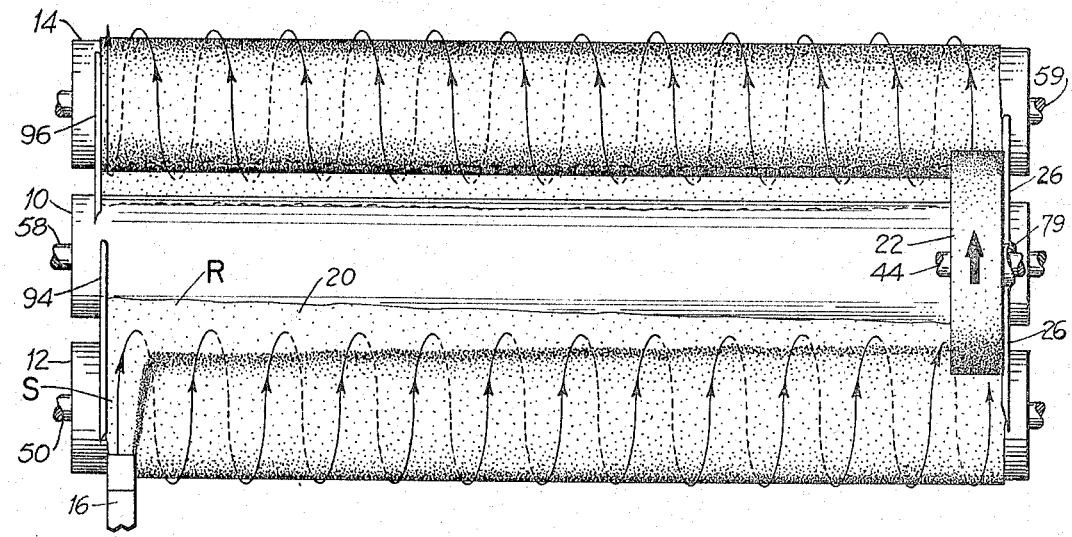
FIG. 2 is a plan view at the developer rollers of FIG. 1 somewhat opened for clarity.

Work input may be controlled and varied in the following ways:

(a) The position of the transfer roller 22 and guide 26 may be moved to the left as viewed in FIG. 2 to shorten the total distance the dough moves along the rollers.

(b) Varying the rate of delivery from the nozzle 16 since material is delivered from the rollers at the rate received. Slowing the rate of delivery for any given r.p.m. increases the work input and vice versa.

(c) Varying the r.p.m. for a given throughput.

There exists a minimum speed of rotation for any given roller developer depending upon the rate of delivery from the nozzle 16. Once, however, this minimum speed is attained (experimentally) then further increases in r.p.m. will produce a higher work input for any constant rate of feed and conversely, a reduced rate of feed for a given r.p.m. will produce increased work input. It should be noted in this regard that for operation at or above the minimum speed of the rollers the delivery or throughput of the developer is controlled purely by the rate of delivery to the developer.

Other changes in work input can be obtained by varying the nip clearance of the developing rollers. However, this approach is generally not as practical or as useful as the control of r.p.m., work throughput or operating roller length.

What is claimed is:

1. A developer comprising a plurality of rollers, one of said rollers rotating in the direction of one hand, the others of said rollers rotating in the direction of the opposite hand, said one roller having a portion of its surface in close spaced relationship to a portion of the surface of each of said other rollers, means to deliver a mixture of the ingredients of dough to one of said rollers so that said mixture may pass through the nip of said one roller with a certain roller of said other rollers and means axially displaced from said depositing means to transfer said mixture from said certain roller to at least one other of said other rollers.

2. A device capable of developing a mixture of dough ingredients into a developed dough delivering said developed dough in a foreshortened thick stream comprising a cluster of spaced parallel developing rollers having a plurality of nips between adjacent counter-rotating rollers, means to limit the movement in an axial direction along said rollers, mechanism to transfer a dough mixture from one of said rollers to another of said rollers at the ends thereof, said roller and said transfer means being so arranged the dough may pass longitudinally in one direction along one of said rollers and longitudinally in the opposite direction along another of said rollers, and a further pair of counter-rotating rollers of shorter length and wider nip to deliver a uniform shortened thickened continuous slab of dough.

3. Apparatus for developing dough comprising a nest of at least three parallel rollers, one of said rollers rotating in the direction of one hand and the other of said rollers rotating in the direction of the opposite hand, said one roller having a portion of its surface in close spaced relationship to a portion of the surface of each of said other rollers to form nips thereof, depositing means to deliver the ingredients of dough to one of said rollers, doctor blades running along and in contact with said one roller at points subsequent in the direction of its rotation to the nips formed with each of said other rollers, dough guide means mounted in contact with said rollers to limit the effective axial length of said rollers, transfer means adjacent said guide means to transfer a ribbon of dough ingredients from one of said other rollers to another of said other rollers and selective means operative to drive said rollers at a selected rotational velocity.

4. Apparatus according to claim 3 and further characterized in that said guide means are adjustably movable along the length of said rollers.

5. Device substantially as set forth in claim 3 and further characterized by a successive spaced pair of counter rotating rollers adapted to reform the ribbon of dough delivered from said plurality of rollers.

6. Apparatus adapted for work input into a plastic substance comprising a pair of parallel spaced counter rotating rollers, a doctor blade engaging one of said rollers along its length in a line subsequent in the direction of rotation thereof to the line of closest adjacency of said roller to the other of said pair, first means adjacent one end of said rollers to deliver plastic substances to said pair of rollers at one point and removal means at a second point adjacent the other end of said rollers from said first point.

7. Apparatus such as set forth in claim 3 and further characterized by two parallel pairs of spaced counter-rotating rollers, said counter rotating rollers having larger clearance at their nips than said developing rollers and being selectively driven at a slower peripheral speed than said developing rollers to form a foreshortened thickened continuous slab of dough.

References Cited by the Examiner
UNITED STATES PATENTS

| | | | |
|---|---|---|---|
| 1,728,703 | 9/1929 | Smith | 107—12 |
| 2,615,404 | 10/1952 | Crosland et al. | 107—12 |
| 2,724,348 | 11/1955 | Neutelings et al. | 107—12 |
| 3,155,054 | 11/1964 | Malavasi | 107—12 |

FOREIGN PATENTS

| | | |
|---|---|---|
| 940,521 | 3/1956 | Germany. |
| 828,810 | 2/1960 | Great Britain. |

WALTER A. SCHEEL, *Primary Examiner.*

R. W. JENKINS, *Assistant Examiner.*